: 3,745,132
Patented July 10, 1973

3,745,132
POLYMERIZATION OF ALKYLENE OXIDES WITH CATALYST COMPRISING REACTION PRODUCT OF ORGANOSTANNIC AND INORGANIC PHOSPHORUS COMPOUNDS
Tadahiro Go, Tatuo Usui, and Toshiko Kaitu, Yokohama, Japan, assignors to The Japanese Geon Company Ltd., Tokyo, Japan
No Drawing. Filed Nov. 24, 1970, Ser. No. 92,547
Claims priority, application Japan, Nov. 25, 1969, 44/93,926; Dec. 19, 1969, 44/101,678, 44/101,679; Dec. 26, 1969, 44/104,681
Int. Cl. C08g 23/14
U.S. Cl. 260—2 A   4 Claims

ABSTRACT OF THE DISCLOSURE

A process for the preparation of alkylene oxide polymers characterized by homopolymerizing an alkylene oxide or copolymerizing alkylene oxides in the presence as catalyst of the reaction product of at least one organotin compound and at least one phosphorus compound selected from the group consisting of phosphoric acid compounds and phosphorus oxide compounds, and a process for the preparation of a catalyst for polymerizing alkylene oxides, characterized by reacting in a solvent at least one organotin compound with at least one phosphorus compound selected from the group consisting of phosphoric acid compounds and phosphorus oxide compounds.

---

The present invention relates to a process for the preparation of an alkylene oxide polymer, and more particularly it relates to a process for the preparation of an alkylene oxide polymer by using as catalyst the reaction product of at least one organotin compound having at least one Sn-C bond at least one phosphorus compound selected from the group consisting of phosphoric acid compounds and phosphorus oxide compounds.

It is industrially important to obtain a high molecular weight polymer of alkylene oxide, and various catalysts have hitherto been invented. For example, a catalyst consisting of an organoaluminum compound and a nitrogen compound, a catalyst consisting of an organozinc compound and a polyol or a polyhydric phenol, etc. have been known, but these are very unstable in the air and a special apparatus is required for handling them. Further, the use of, e.g., an organotin compound has been proposed as polymerization catalyst for ethylene oxide, but this has a low polymerization activity and gives only a liquid or wax-like low molecular weight polymer.

Accordingly, one object of the present invention is to provide a process for the preparation of an alkylene oxide polymer at low cost by using a catalyst which has a high polymerization activity and is easy to handle.

The other objects of the present invention will become apparent from the following description.

These objects of the present invention can be achieved by the method described in the opening paragraph.

As examples of the organotin compound of the present invention having at least one Sn-C bond, alkyltin compounds such as tetraethyltin, tetrabutyltin, tetraphenyltin, aryltrimethyltin, triethylphenyltin, diamyldibutyltin, benzylbutyldiphenyltin and hexaethyldistannoxane; alkyltin halide compounds such as tributyltin chloride, triethyltin fluoride, aryldibutyltin bromide and dibutyltin dichloride; alkyltin oxide compounds such as bistriethyltin oxide, dibutyltin oxide and bistributyltin oxide; alkyltin hydroxide compounds such as trimethyltin hydroxide and benzylbutylphenyltin hydroxide; alkyltin sulphides such as bistriethyltin sulphide; alkylalkoxytin compounds such as dibutoxydibutyltin; organotin carboxylic acid derivative compounds such as dibutyltin dimalate; organotin acid compounds such as benzenestannic acid; organotin hydride compounds such as butyltin trihydride; and other organotin compounds such as bisdiphenyltin pyrophosphate and dibutyltin sodium may be mentioned.

As examples of the phosphorus compound of the present invention, phosphoric acid compounds such as hypophosphorus acid, phosphorous acid, diphosphorous acid, isohypophosphorous acid, condensed phosphoric acid, polyphosphoric acid, strong phosphoric acid and metaphosphoric acid; and phosphorus oxide compounds such as phosphorus dioxide, phosphorus trioxide and phosphorus pentoxide may be mentioned.

As regards the amount of the phosphorus compound, 0.001 to 100 mols of the phosphorus compound per mol of the organotin compound may be used, but an amount of 0.01 to 10 mols is usually used. The reaction between the two proceeds even at room temperature and gives a solid catalyst having a polymerization activity, but in order to obtain a polymerization catalyst having a higher activity, it is preferable to react the two at a temperature above 100° C. At this time, the desired catalyst can be formed either in the air, in an inert gas, in a solvent or in the presence of water. However, it is most preferable to react the two in one of the below-mentioned solvents preferably at the boiling point of the solvent. If this reaction product is used as catalyst in the polymerization after the solvent is removed and the reaction product is dried, an alkylene oxide can be obtained with a remarkably high yield. In other words, said catalyst prepared in the solvent gives the objective polymer even with a remarkably small using amount.

As examples of the solvent used in the present invention for preparing the catalyst, aliphatic hydrocarbons such as hexane and heptane; aromatic hydrocarbons such as benzene, toluene and xylene; halogenated hydrocarbons such as benzene, toluene and xylene; halogenated hydrocarbons such as carbon tetrachloride and monochlorobenzene; esters such as ethyl acetate and n-butyl acetate; haloalkanes such as methylene chloride and ethylene dichloride; ethers such as diethyl ether and dipropyl ether; and water may be mentioned.

As described above, the object of the present invention can be essentially achieved by using as catalyst the reaction product of an organotin compound and a phosphorus compound, but according to the present invention, a polymer having a high degree of polymerization can be produced with a higher yield if at least one organoaluminum compound and/or at least one titanium alkoxide compound are used jointly with said reaction product.

As examples of the organoaluminum compound, alkylaluminum compounds and alkylaluminum halide compounds having at least one Al—C bond such as triethylaluminum, triisobutylaluminum, tridodecylaluminum, ethylisobutylaluminum chloride, diethylaluminum fluoride, diethylaluminum chloride, diisobutylaluminum hydride, dimethylaluminum bromide and ethylaluminum sesquichloride; and aluminum alkoxide compounds having at least one Al—O—R (R: alkyl) bond such as aluminum triethoxide, aluminum triisopropoxide, aluminum tributoxide, monochloroaluminum diisopropoxide and dichloroaluminum monobutoxide may be mentioned.

The titanium alkoxide compound of the present invention means a compound represented by the general formula:

Ti(OR)₄ (R: alkyl)

or its polymer or condensation product. As examples of such compound, titanium tetraethoxide, titanium tetrapropoxide, titanium tetraisopropoxide, titanium tetra-n-butoxide, titanium tetra-2-ethylhexoxide and titanium tetrastearoxide may be mentioned.

The amounts of the organoaluminum compound and/or the titanium alkoxide compound to be added to the reaction product of an organotin compound and a phosphorus compound may each be within the range of 0.001–100 parts by weight, but an amount of 0.01–10 parts is usually used. Further, it is preferable that the reaction product of the organotin compound and the phosphorus compound should be dried. As the drying method, any usually used method such as vacuum drying or drying by heating may be used.

As examples of alkylene oxide which can be homo- or copolymerized by the process of the present invention, alkylene oxides such as ethylene oxide, propylene oxide, butene oxide and isobutylene epoxide; substituted alkylene oxides such as epichlorohydrin, epibromo-hydrin, methacrylic chloride epoxide, trifluoromethylethylene oxide, perfluoropropylene oxide, perfluoropropylene oxide, vinyl chloride epoxide, dichloroisobutylene epoxide, 1,2-dichloro-3,4-epoxybutane, 1-chloro-3,4-epoxybutane, 1-chloro-4,5-epoxypentane, 1,1-dichloro-2,3-epoxypropane, 1,1,1-trichloro-2,3-epoxypropane and 1,1,1-trichloro-3,4-epoxybutane; alicyclic epoxides such as cyclohexane oxide, vinylcyclohexene oxide, α-pinene epoxide and dipentene epoxide; alkyl glycidyl ethers such as methyl glycidyl ether, ethyl glycidyl ether, isopropyl glycidyl ether, isobutyl glycidyl ether, tert-glycidyl ether, n-hexyl glycidyl ether and n-octyl glycidyl ether; phenyl glycidyl ethers such as phenyl glycidyl ether; chlorophenyl glycidyl ether and nitrophenyl glycidyl ether; halogenoalkyl glycidyl ethers such as chloroethyl glycidyl ether, bromoethyl glycidyl ether and 2-chloro-1-methylethyl glycidyl ether; unsaturated glycidyl ethers such as vinyl glycidyl ether and allyl glycidyl ether; glycidyl esters such as glycidyl acetate, glycidyl propionate, glycidyl pivalate, glycidyl methacrylate and glycidyl acrylate; and epoxides such as styrene oxide, α-methylstyrene oxide, butadiene mono- or di-oxide, epoxy stearate, 1-dimethylamino-2,3-epoxypropane and trimethyl-2,3-epoxypropyl ammonium chloride may be mentioned.

At the time of polymerization of alkylene oxide by the method of the present invention, the reaction product of an organotin compound and a phosphorus compound is usually used in an amount of 0.1–10 parts by weight per 100 parts by weight of the monomer, and an organoaluminum compound and/or a titanium alkoxide compound are usually used each in an amount of 0.1–10 parts by weight per 100 parts by weight of the monomer. The polymerization may be carried out within a wide temperature range of −20 to 200° C. but usually it is carried out at a temperature of 0 to 100° C. in the presence or absence of a solvent. As the solvent, an ether such as diethyl ether, dipropyl ether or diisopropyl ether; an aromatic hydrocarbon such as benzene or toluene; a saturated aliphatic hydrocarbon such as n-heptane; an alicyclic hydrocarbon such as cyclohexane; a halogenated hydrocarbon such as chlorobenzene; a haloalkane such as methyl chloride, ethylene chloride, chloroform, carbon tetrachloride or ethylene dichloride; etc. is used. Further, in case an organoaluminum compound and/or a titanium alkoxide compound are used together with the reaction product of an organotin compound and a phosphorus compound, the catalysts, monomer and solvent may be added in any order. For example, it is also effective to initiate polymerization in the presence of one catalyst and add the other in the course of polymerization.

The molecular weight of the alkylene oxide homo- or co-polymer prepared under said conditions is shown by reduced viscosity as shown in the examples. The reduced viscosity means a $\eta_{sp./c.}$ value measured as to a polymer solution in a diluent. As regards ethylene oxide and propylene oxide polymers, 0.2 g. of the polymer was dissolved in 100 ml. of benzene and measurement was carried out at a temperature of 30° C. As regards copolymers containing epichlorohydrin, the polymer was dissolved in cyclohexanone containing 0.5% of 2,2′-methylene-bis(4-methyl-6-t.butyl phenol) as antioxidant to prepare a 1.0% solution of the polymer, the solution was heated to 100° C. to prepare a complete solution, it was cooled to 50° C., and then measurement was carried out at this temperature.

Next, the present invention will be explained concretely by means of examples.

EXAMPLES 1–6

Dibutyltin dilaurate was reacted with orthophosphoric acid by varying their ratio variously, and the solid product thus obtained was used to polymerize ethylene oxide.

Commercially available 85% phosphoric acid was dehydrated by heating it at 260° C., and thus viscous phosphoric acid having a $P_2O_5$ content of 72% which was equivalent to orthophosphoric acid was obtained. Various parts by weight of this phosphoric acid were placed in glass reaction vessels, various parts by weight of dibutyltin dilaurate were added thereto, respectively, and then the mixtures were heated at 260° C. for 30 minutes. Thus, brown solid products were obtained. One part by weight (100 mg.) of each solid product was placed in a 100 ml. glass ampoule, the air in the ampoule was replaced by nitrogen, and then 100 parts by weight (10 g.) of ethylene oxide dissolved in benzene to form a 20% solution were added thereto. The ampoule was placed in a rotating apparatus, and polymerization reaction was carried out at 60° C. for 22 hours. After completion of the reaction, the formed polymer was taken out, a n-hexane insoluble polymer was separated and dried, and thus a white solid polymer was obtained.

The amount of the catalyst thus formed and the yield and $\eta_{sp./c.}$ of polyethylene oxide thus obtained are shown in the following Table 1. As may be apparent from the table, a polymerization activity was shown and a high polymer was obtained in every case, although the results differed with the ratio of dibutyltin dilaurate to orthophosphoric acid.

TABLE 1

| Ex. | Dibutyltin dilaurate (grams) | Orthophosphoric acid (grams) | Orthophosphoric acid/dibutyltin dilaurate (molar ratio) | Amount catalyst formed (grams) | Polyethylene oxide Yield percent | $\eta_{sp./c.}$ |
|---|---|---|---|---|---|---|
| 1 | 34.8 | 11.7 | 2.16 | 43.2 | 20.6 | 12.3 |
| 2 | 37.6 | 5.6 | 0.96 | 37.6 | 24.3 | 14.7 |
| 3 | 32.4 | 2.4 | 0.48 | 28.7 | 47.5 | 9.5 |
| 4 | 37.5 | 1.4 | 0.24 | 31.7 | 51.2 | 8.8 |
| 5 | 35.2 | 0.5 | 0.09 | 28.1 | 14.6 | 3.4 |
| 6 | 40.1 | 0.3 | 0.05 | 29.1 | 5.7 | 3.1 |

EXAMPLES 7–12

Ethylene oxide was polymerized by varying the kind of organotin compound and the kind of phosphorus compound.

Namely, 1 part by weight of a solid product obtained by heating an organotin compound and a phosphorus compound at 260° C. for 30 minutes as shown in Examples 1–6 was used, and 100 parts by weight of ethylene oxide were polymerized under the same conditions as in Examples 1–6. The amount of the catalyst thus formed and the yield and $\eta_{sp./c.}$ of polyethylene oxide thus obtained are shown in the following Table 2. As may be apparent from the table, a polymerization activity was shown and a high polymer was obtained in every case.

| Ex. | Organotin compound | Grams | Phosphorus compound | Grams | Phosphorus compound/ organotin compound (molar ratio) | Amount of catalyst formed (grams) | Polyethylene oxide Yield (percent) | ηsp./C. |
|---|---|---|---|---|---|---|---|---|
| 7 | Dibutyltin dilaurate | 40.4 | Commercial 85% phosphoric acid | ¹3.0 | ¹0.48 | 36.9 | 40.3 | 5.8 |
| 8 | do | 30.9 | Phosphorus pentoxide | 3.3 | 0.47 | 29.3 | 11.1 | 9.8 |
| 9 | Dibutyltin oxide | 38.8 | Orthophosphoric acid | 6.1 | 0.43 | 43.8 | 22.2 | 1.9 |
| 10 | do | 24.7 | do | 9.8 | 1.07 | 32.9 | 1.4 | 1.2 |
| 11 | Dibutyltin dichloride | 31.6 | do | 5.1 | 0.50 | 32.5 | 1.6 | 0.9 |
| 12 | Tetraethyltin | 14.5 | do | 3.0 | 0.50 | 16.7 | 3.9 | 2.6 |

¹ Calculated in terms of orthophosphoric acid.

COMPARATIVE EXAMPLE A

For comparison's sake, polymerization of ethylene oxide was carried out under the same conditions as in Examples 1–12 except that orthophosphoric acid or phosphorus pentoxide was used as catalyst. In each case, however, no polymer was produced.

COMPARATIVE EXAMPLE B

For comparison's sake, polymerization of ethylene oxide was carried out under the same conditions as in Examples 1–12 except that dibutyltin dilaurate, dibutyltin dichloride, tetraethyltin or dibutyltin oxide was used as catalyst. In each case, however, only a trace amount of liquid polymer was obtained.

EXAMPLES 13–16

Epichlorohydrin and propylene oxide were polymerized using the catalyst used in Example 3. In Examples 14 and 16, a 50% solution of the monomer obtained by diluting the monomer with benzene was used. The polymerization was carried out at 60° C. for 22 hours by using 4 parts by weight of catalyst per 100 parts by weight of monomer. After completion of the reaction, the hexane insoluble portion was separated and dried, and thus a white solid polymer was obtained, in the case of epichlorohydrin polymer. In the case of propylene oxide polymer, the reaction product was homogeneously dissolved in benzene of three times as much amount, and then a white solid polymer was obtained by freeze drying. The yield and ηsp./C. of the polymer are shown in the following Table 3. It is found from these examples that both epichlorohydrin and propylene oxide give high polymers in the presence of a catalyst of the present invention, regardless of the presence or absence of solvent.

TABLE 3

| Ex. | Monomer | Monomer concentration (wt. percent) | Polymer yield (percent) | ηsp./C. |
|---|---|---|---|---|
| 13 | Epichlorohydrin | 100 | 22.0 | 2.4 |
| 14 | do | 50 | 6.7 | 2.1 |
| 15 | Propylene oxide | 100 | 35.8 | 12.5 |
| 16 | do | 50 | 27.5 | 11.3 |

EXAMPLES 17–18

Polymerization of epichlorohydrin was carried out under the same conditions as in Example 13 except that the catalyst used in Example 7 or 8 was used as catalyst. A high polymer was obtained in each case. The results are shown in the following Table 4.

TABLE 4

| Ex. | Catalyst Phosphorus compound/organotin compound | Molar ratio | Polyepichlorohydrin Yield (percent) | ηsp./C. |
|---|---|---|---|---|
| 13 | Orthophosphoric acid/dibutyltin dilaurate | 0.48 | 22.0 | 2.4 |
| 17 | Commercial 85% phosphoric acid/dibutyltin dilaurate | 0.48 | 36.1 | 2.9 |
| 18 | Phosphorus pentoxide/dibutyltin dilaurate | 0.47 | 11.8 | 1.9 |

EXAMPLES 19–21

Polymerization of epichlorohydrin, propylene oxide or ethylene oxide was carried out by using the catalyst used in Example 3. 4 parts by weight of catalyst were used per 100 parts of monomer, and the polymerization was carried out at 30° C. for 42 hours. The results are shown in the following Table 5.

TABLE 5

| Ex. | Monomer | Concentration of monomer (weight percent) | Yield of polymer (percent) | ηsp./C. of polymer |
|---|---|---|---|---|
| 19 | Epichlorohydrin | 30 | 3.2 | 1.9 |
| 20 | Propylene oxide | 30 | 11.1 | 10.7 |
| 21 | Ethylene oxide | 20 | 28.6 | 11.5 |

EXAMPLES 22–32

Copolymerization of epichlorohydrin and ethylene oxide was carried out using the catalyst used in Examples 2–12. 2 parts by weight of catalyst were used per 100 parts by weight of a monomer mixture consisting of 90.5 parts by weight of epichlorohydrin and 9.5 parts by weight of ethylene oxide, and the polymerization was carried out at 60° C. for 22 hours, except Example 32 where it was carried out at 30° C. for 42 hours. After completion of the reaction, the n-hexane insoluble portion was separated and dried, and thus a white solid copolymer was obtained. The composition of the copolymer was determined by measuring its chlorine content. The composition, yield and ηsp./C. of the copolymer are shown in the following Table 6.

TABLE 6

| Ex. | Catalyst¹ | Epichlorohydrin-ethylene oxide copolymer Composition (ethylene oxide percent) | Yield (percent) | ηsp./C. |
|---|---|---|---|---|
| 22 | 2 | 57.1 | 10.8 | 1.8 |
| 23 | 3 | 52.2 | 21.0 | 3.0 |
| 24 | 4 | 52.9 | 19.2 | 2.7 |
| 25 | 5 | 57.8 | 10.3 | 2.5 |
| 26 | 6 | 53.6 | 16.9 | 2.5 |
| 27 | 7 | 50.3 | 24.6 | 3.7 |
| 28 | 8 | 57.6 | 6.5 | 2.7 |
| 29 | 10 | 47.9 | 27.4 | 1.0 |
| 30 | 11 | 60.0 | 2.8 | 0.8 |
| 31 | 12 | 32.7 | 44.4 | 0.9 |
| 32 | 3 | 58.3 | 4.9 | 3.2 |

¹ The same with the catalyst used in the below-mentioned example.

REFERENTIAL EXAMPLE

The epichlorohydrin - ethylene oxide copolymer obtained in Example 23 was mixed with other ingredients in accordance with the below-described prescription with the aid of a mixing roll, and then it was pressed while vulcanizing it at 155° C. for 30 minutes. Some physical properties of the vulcanization product thus obtained are shown in Table 7. As may be apparent from the table, this copolymer is an industrially very excellent rubber having especially superior resistance to oils, elasticity and low temperature characteristics.

PRESCRIPTION

| Epichlorohydrin-ethylene oxide: | Parts by weight |
|---|---|
| Copolymer | 100 |
| Tin stearate | 2 |
| FEF carbon | 30 |
| Triplumbic tetroxide | 5 |
| 2-Mercapto imidazoline | 1.5 |
| Nickel dibutyl dithiocarbamate | 2 |

TABLE 7

| | |
|---|---|
| Tensile strength, kg./cm.$^2$ | 129 |
| 100% modulus, kg./cm.$^2$ | 28 |
| 200% modulus, kg./cm.$^2$ | 63 |
| 300% modulus, kg./cm.$^2$ | 84 |
| Elongation, percent | 500 |
| Hardness, JIS | 57–55 |
| Rebound (Tripsometer), percent | 55.3 |
| Change of volume when immersed in oils, percent: | |
| Fuel oil B, room temperature×70 hours | 16 |
| ASTM #3, 100° C.×70 hrs. | 6 |
| Gehman low temperature test, °C.: | |
| $T_5$ | −37.0 |
| $T_{100}$ | −47.2 |

EXAMPLES 33–40

The catalyst used in Example 3 (which will hereinafter be referred to as A) was placed in a 40 ml. glass ampoule in an amount indicated in the following Table 8, the air inside the ampoule was replaced by nitrogen, and then triisobutylaluminum (a 4.5% solution in benzene; which will hereinafter be referred to as B) was added in an amount indicated in Table 8. Further, 100 parts by weight (10 g.) of ethylene oxide (a 20% solution in benzene) were added thereto. The ampoule was placed in a rotating apparatus, and then polymerization reaction was carried out at 30° C. for 20 hours. After completion of the reaction, the formed polymer was taken out, the n-hexane insoluble portion was separated and dried, and thus a white solid polymer was obtained. The amounts of catalysts used and the yield was $\eta_{sp./C.}$ of polyethylene oxide are shown in the following Table 8.

TABLE 8

| | Parts by weight of— | | Polyethylene oxide | |
|---|---|---|---|---|
| Ex. | A | B | Yield (percent) | $\eta_{sp.}/C.$ |
| 33 | 2.0 | | 6.3 | 4.9 |
| 34 | 2.0 | 0.5 | 22.4 | 9.6 |
| 35 | 2.0 | 1.0 | 36.3 | 13.1 |
| 36 | 2.0 | 2.0 | 38.6 | 15.6 |
| Comparative Example c | | 2.0 | 3.6 | 4.5 |
| 37 | 0.5 | 2.0 | 9.0 | 10.4 |
| 38 | 1.0 | 2.0 | 27.3 | 12.9 |
| 39 | 2.0 | 2.0 | 38.6 | 15.6 |
| 40 | 4.0 | 2.0 | 65.8 | 17.6 |

EXAMPLE 41

Polymerization was carried out under the same conditions as in Example 34 except that the order of addition of triisobutylaluminum and ethylene oxide was reversed. Namely, A was placed in the ampoule, the benzene solution of ethylene oxide was added thereto, and then B was added. Thus, a solid polymer having $\eta_{sp./C.}$ of 12.4 was obtained with a yield of 20.3%.

EXAMPLES 42–46

5 parts by weight of A were placed in a glass ampoule, the air inside the ampoule was replaced by nitrogen, B was added thereto in an amount indicated in the following Table 9, and then 100 parts by weight of epichlorohydrin (a 30% solution in benzene) were added thereto. The ampoule was placed in a rotating apparatus, and then polymerization reaction was carried out at 30° C. for 20 hours. After completion of the reaction, the formed polymer was taken out, the n-hexane insoluble portion was separated and dried, and thus a white solid polymer was obtained. The amounts of catalysts used and the yield and $\eta_{sp./C.}$ of polyepichlorohydrin are shown in Table 9.

TABLE 9

| | Parts by weight of— | | Polyepichlorohydrin | |
|---|---|---|---|---|
| Ex. | A | B | Yield (percent) | $\eta_{sp.}/C.$ |
| 42 | 5.0 | | 3.4 | 1.5 |
| 43 | 5.0 | 0.5 | 19.6 | 2.1 |
| 44 | 5.0 | 1.0 | 35.8 | 3.6 |
| 45 | 5.0 | 2.0 | 36.6 | 4.0 |
| 46 | 5.0 | 5.0 | 41.2 | 4.4 |
| Comparative Example d | | 2.0 | 0.0 | |

EXAMPLES 47–51

3 parts by weight of A were placed in a glass ampoule, the air inside the ampoule was replaced by nitrogen, B was added thereto in an amount indicated in the following Table 10, and then 100 parts by weight of propylene oxide (a 30% solution in benzene) were added thereto. The ampoule was placed in a rotating apparatus, and then polymerization reaction was carried out at 60° C. for 22 hours. After completion of the reaction, the formed polymer was taken out, it was homogeneously dissolved in benzene of three times as much amount, and then it was freeze dried. Thus, a white solid polymer was obtained. The amounts of catalysts used and the yield and $\eta_{sp./C.}$ of polypropylene oxide are shown in the following Table 10.

TABLE 10

| | Parts by weight of— | | Polypropylene oxide | |
|---|---|---|---|---|
| Ex. | A | B | Yield (percent) | $\eta_{sp.}/C.$ |
| 47 | 3.0 | | 8.5 | 9.7 |
| 48 | 3.0 | 0.5 | 9.9 | 10.5 |
| 49 | 3.0 | 1.0 | 13.0 | 11.8 |
| 50 | 3.0 | 2.0 | 14.7 | 16.2 |
| 51 | 3.0 | 3.0 | 25.6 | 12.9 |
| Comparative Example e | | 3.0 | 11.6 | 1.4 |

EXAMPLES 52–55

2 parts by weight of A were placed in an ampoule, the air inside the ampoule was replaced by nitrogen, 2 parts by weight of one of the aluminum compounds indicated in the following Table 11 (each as a 5% solution in benzene excepting the case of aluminum isopropoxide where a 2% solution in benzene was used) were added thereto, and then 100 parts by weight of ethylene oxide (a 20% solution in benzene) were added. The ampoule was placed in a rotating apparatus, and then polymerization reaction was carried out at 30° C. for 2 hours. After completion of the reaction, the formed polymer was taken out, the n-hexane insoluble portion was separated and dried, and thus a white solid polymer was obtained. The yield and $\eta_{sp./C.}$ of the polyethylene oxide thus obtained are shown in the following Table 11. It is found from the table that the use of any one of the aluminum compounds together with A increases the yield and the degree of polymerization of the polymer.

TABLE 11

| Ex. | A (parts by weight) | Aluminum compound Kind | Parts by weight | Polyethylene oxide Yield (percent) | $\eta_{sp.}/c$ |
|---|---|---|---|---|---|
| 52 | 2.0 | Triethylaluminum | 2.0 | 24.3 | 13.4 |
| Comparative Example f | | do | 2.0 | 7.1 | 4.2 |
| 53 | 2.0 | Diisobutylaluminum hydride | 2.0 | 35.1 | 9.2 |
| Comparative Example g | | do | 2.0 | 2.4 | (*) |
| 54 | 2.0 | Diethylaluminum chloride | 2.0 | 25.9 | 7.3 |
| Comparative Example h | | do | 2.0 | 1.3 | (*) |
| 55 | 2.0 | Aluminum triisopropoxide | 2.0 | 19.2 | 5.9 |
| Comparative Example i | | do | 2.0 | 1.6 | (*) |

*Indicate that the measurement was impossible since only a very small amount of product was obtained.

EXAMPLES 56–64

To 2 parts by weight of the reaction product of an organotin compound and a phosphorus compound indicated in the following Table 12, 0 or 2 parts by weight of B were added, and then 100 parts by weight of ethylene oxide (a 20% solution in benzene) were added thereto. Then, polymerization reaction was carried out at 30° C. for 20 hours as in Example 34. The amounts of the organotin compound and the phosphorus compound, the amount of the reaction product, and the yield and $\eta_{sp.}/c$ of polyethylene oxide are shown in Table 12.

TABLE 12

| | | Amount of B added (parts by weight) | | | |
|---|---|---|---|---|---|
| | The reaction product,[1] the same as in Ex.— | 0 | 2 | 0 | 2 |
| | | Polyethylene oxide | | | |
| Ex. | | Yield (percent) | $\eta_{sp.}/c$ | Yield (percent) | $\eta_{sp.}/c$ |
| 56 | 1 | 4.9 | 29.4 | 2.6 | 14.7 |
| 57 | 2 | 5.3 | 32.5 | 4.3 | 13.1 |
| 58 | 4 | 14.2 | 56.8 | 6.0 | 19.5 |
| 59 | 5 | 2.6 | 12.2 | (*) | 8.2 |
| 60 | 7 | 9.7 | 44.3 | 7.8 | 17.6 |
| 61 | 8 | 2.1 | 11.4 | (*) | 9.7 |
| 62 | 9 | 4.1 | 29.9 | 1.2 | 1.9 |
| 63 | 11 | 0.4 | 2.7 | (*) | 1.4 |
| 64 | 12 | 1.0 | 6.2 | (*) | 3.1 |

[1] Organotin compound and phosphorus compound.
*See footnote (*) bottom of Table 11.

EXAMPLES 65–68

2 parts by weight (200 mg.) of the catalyst used in Example 3 (namely, A) were placed in a 40 ml. glass ampoule, the air inside the ampoule was replaced by nitrogen, titanium tetrabutoxide (a 5% solution in benzene; which will hereinafter be referred to as C) was added thereto in an amount indicated in the following Table 13, and then 100 parts by weight (10 g.) of ethylene oxide (a 20% solution in benzene) were added. The ampoule was placed in a rotating apparatus, and then polymerization reaction was carried out at 30° C. for 20 hours. After completion of the reaction, the former polymer was taken out, the n-hexane insoluble portion was separated and dried, and thus a white solid polymer was obtained. The amounts of catalysts used and the yield and $\eta_{sp.}/c$ of polyethylene oxide are shown in Table 13. It is found from the table that the joint use of titanium tetrabutoxide increases the yield and the degree of polymerization of the polymer.

TABLE 13

| | Parts by weight of— | | Polyethylene oxide | |
|---|---|---|---|---|
| Ex. | A | C | Yield (percent) | $\eta_{sp.}/c$ |
| 65 | 2.0 | | 6.3 | 4.9 |
| 66 | 2.0 | 1.0 | 22.8 | 7.8 |
| 67 | 2.0 | 2.0 | 24.2 | 9.5 |
| 68 | 2.0 | 4.0 | 24.2 | 11.4 |
| Comparative Example j | | 2.0 | 0.4 | (*) |

*See footnote (*) bottom of Table 11.

EXAMPLES 69–71

5 parts by weight of A were placed in a glass ampoule, the air inside the ampoule was replaced by nitrogen, C was added thereto in an amount indicated in the following Table 14, and then 100 parts by weight of epichlorohydrin (a 30% solution in benzene) were added. The ampoule was placed in a rotating apparatus, and then polymerization reaction was carried out at 60° C. for 20 hours. After completion of the reaction, the formed polymer was taken out, the n-hexane insoluble portion was separated and dried, and thus a white solid polymer was obtained. The amounts of catalysts used and the yield and $\eta_{sp.}/c$ of polyepichlorohydrin were as shown in Table 14.

TABLE 14

| | Parts by weight of— | | Polyepichlorohydrin | |
|---|---|---|---|---|
| Ex. | A | C | Yield (percent) | $\eta_{sp.}/c$ |
| 69 | 5.0 | | 5.0 | 0.9 |
| 70 | 5.0 | 2.0 | 13.6 | 1.8 |
| 71 | 5.0 | 5.0 | 17.8 | 2.1 |
| Comparative Example k | | 5.0 | 1.5 | (*) |

*See footnote (*) bottom of Table 11.

EXAMPLES 72–75

3 parts by weight of A were placed in a glass ampoule, the air inside the ampoule was replaced by nitrogen, C was added thereto in an amount indicated in the following Table 15, and then 100 parts by weight of propylene oxide (a 30% solution in benzene) were added. The ampoule was placed in a rotating apparatus, and then polymerization reaction was carried out at 60° C. for 20 hours. After completion of the reaction, the formed polymer was taken out, it was homogeneously dissolved in benzene of three times as much amount, and then it was freeze dried. Thus, a white solid polymer was obtained. The amounts of catalysts used and the yield and $\eta_{sp.}/c$ of polypropylene oxide were as shown in Table 15.

TABLE 15

| | Parts by weight of | | Polypropylene oxide | |
|---|---|---|---|---|
| Ex. | A | C | Yield (percent) | $\eta_{sp.}/c$ |
| 72 | 3.0 | | 8.0 | 7.5 |
| 73 | 3.0 | 1.0 | 15.9 | 7.6 |
| 74 | 3.0 | 3.0 | 21.6 | 8.8 |
| 75 | 3.0 | 6.0 | 23.3 | 8.0 |
| Comparative Example l | | 3.0 | 1.5 | (*) |

*See footnote (*) bottom of Table 11.

EXAMPLES 76–79

5.6 g. of commercially available 85% phosphoric acid were placed in a glass ampoule, and then 10 g. of water and 64.1 g. of dibutyltin dilaurate were added thereto. This mixture was heated at 130° C. for 60 minutes and then at 260° C. for 30 minutes while distilling water off, and thus 58.2 g. of a brown solid product were obtained.

2 parts by weight of this solid product were placed in an ampoule, the air inside the ampoule was replaced by nitrogen, titanium tetrapropoxide (a 5% solution in benzene) was added thereto in an amount indicated in the following Table 16, and then 100 parts by weight of ethylene oxide (a 20% solution in benzene) were added. The polymerization reaction was carried out at 30° C. for 20 hours. The amounts of catalysts used and the yield and $\eta_{sp./c.}$ of polyethylene oxide were as shown in Table 16.

TABLE 16

| Ex. | Reaction product [1] (parts by weight) | Titanium tetra-propoxide (parts by weight) | Polyethylene oxide Yield (percent) | $\eta_{sp./c.}$ |
|---|---|---|---|---|
| 76 | 2.0 | | 13.1 | 6.3 |
| 77 | 2.0 | 1.0 | 34.6 | 10.6 |
| 78 | 2.0 | 2.0 | 36.1 | 12.1 |
| 79 | 2.0 | 4.0 | 40.3 | 8.7 |
| Comparative Example m | | 2.0 | 0.6 | (*) |

[1] Commercial 85% phosphoric acid and dibutyltin dilaurate.
—See footnote (*) bottom of Table 11.

EXAMPLES 80–82

2 parts by weight of the solid product obtained in Example 77, 78 or 79 were placed in an ampoule, the air inside the ampoule was replaced by nitrogen, the tetramer of titanium tetrabutoxide (a 5% solution in benzene) was added thereto in an amount indicated in the following Table 17, and then 100 parts by weight of ethylene oxide (a 20% solution in benzene) were added. The polymerization reaction was carried out at 30° C. for 20 hours. The amounts of catalysts used and the yield and $\eta_{sp./c.}$ of polyethylene oxide were as shown in Table 17.

TABLE 17

| Ex. | Reaction product [1] (parts by weight) | Titanium tetra-butoxide (parts by weight) | Polyethylene oxide Yield (percent) | $\eta_{sp./c.}$ |
|---|---|---|---|---|
| 76 | 2.0 | | 13.1 | .3 |
| 80 | 2.0 | 1.0 | 21.6 | 7.7 |
| 81 | 2.0 | 2.0 | 20.6 | 6.6 |
| 82 | 2.0 | 4.0 | 33.8 | 7.4 |
| Comparative Example n | | 2.0 | 0.5 | (*) |

[1] See footnote ([1]) bottom of Table 16.
*See footnote (*) bottom of Table 11.

EXAMPLES 83–91

To 2 parts by weight of the reaction product of an organotin compound and a phosphorus compound indicated in the following Table 18, 0 to 2 parts by weight of C were added, and then 100 parts by weight of ethylene oxide (a 20% solution in benzene) were added. Then, polymerization reaction was carried out at 30° C. for 20 hours. The yield and $\eta_{sp./c.}$ of the polyethylene oxide thus obtained were as shown in Table 18.

TABLE 18

| Ex. | The reaction product,[1] the same as in Ex.— | Amount of C added (parts by weight) | | | |
|---|---|---|---|---|---|
| | | 0 | 2 | 0 | 2 |
| | | Polyethylene oxide | | | |
| | | Yield (percent) | | $\eta_{sp./c.}$ | |
| 83 | 1 | 4.9 | 22.3 | 2.6 | 12.7 |
| 84 | 2 | 5.3 | 27.9 | 4.3 | 14.1 |
| 85 | 4 | 14.2 | 41.5 | 6.0 | 15.4 |
| 86 | 5 | 2.6 | 7.9 | (*) | 4.8 |
| 87 | 7 | 9.7 | 38.3 | 7.8 | 14.6 |
| 88 | 8 | 2.1 | 10.4 | (*) | 8.2 |
| 89 | 9 | 4.1 | 27.6 | 1.2 | 1.9 |
| 90 | 11 | 0.4 | 2.9 | (*) | 1.2 |
| 91 | 12 | 1.0 | 5.8 | (*) | 2.9 |

[1] Organotin compound and phosphorus compound.
*See footnote (*) bottom of Table 11.

EXAMPLES 92–102

The reaction of dibutyltin oxide and orthophosphoric acid was carried out in various solvents, and the solid product thus obtained was used to polymerize ethylene oxide.

Commercially available 85% phosphoric acid was dehydrated by heating it to 260° C., and thus viscous phosphoric acid having a $P_2O_3$ content of 72% which was equivalent to orthophosphoric acid was obtained. An amount of this phosphoric acid was placed in a glass reaction vessel, 100 ml. of a solvent were added thereto, and then an amount of dibutyltin oxide was added. Then, the reaction was carried out at the boiling point of the solvent for 60 minutes, and then the solvent was removed. Thus, a solid product was obtained.

0.2 part by weight (20 mg.) of this solid product was placed in a 100 ml. glass ampoule, the air inside the ampoule was replaced by nitrogen, and then 100 parts by weight (10 g.) of ethylene oxide (a 20% solution in benzene) were added thereto. The polymerization reaction was carried out at 60° C. for 20 hours. After completion of the reaction, the formed polymer was taken out, the n-hexane insoluble portion was separated and dried, and thus a white solid polymer was obtained. The yield and $\eta_{sp./c.}$ of the polyethylene oxide thus obtained were as shown in the following Table 19.

For comparison's sake, 0.2 part of a solid catalyst obtained by heating a mixture of orthophosphoric acid and dibutyltin oxide at a molar ratio of 0.5:1 at 260° C. for 30 minutes without using any solvent was used, and polymerization was carried out under the same conditions as described above. As a result, polyethylene oxide having $\eta_{sp./c.}$ of 2.4 was obtained with a yield of 4.4%.

TABLE 19

| Ex. | Ortho-phosphoric acid (grams) | Dibutyltin oxide (grams) | Orthophosphoric acid/dibutyltin oxide (molar ratio) | Solvent for preparation of catalyst | Polyethylene oxide Yield (percent) | $\eta_{sp./c.}$ |
|---|---|---|---|---|---|---|
| 92 | 4.2 | 21.2 | 0.5 | p-Xylene | 35.2 | 4.3 |
| 93 | 5.3 | 13.4 | 1.0 | do | 78.6 | 8.0 |
| 94 | 3.2 | 16.2 | 2.0 | Toluene | 15.3 | 4.0 |
| 95 | 2.7 | 27.2 | 4.0 | do | 17.2 | 12.4 |
| 96 | 3.1 | 7.6 | 1.0 | Water | 23.2 | 2.5 |
| 97 | 3.2 | 8.1 | 1.0 | Monochlorobenzene | 68.5 | 9.3 |
| 98 | 3.3 | 8.4 | 1.0 | Toluene 100 ml., water 10 ml. | 40.8 | 6.7 |
| 99 | 2.8 | 7.1 | 1.0 | n-Butyl acetate | 28.9 | 4.5 |
| 100 | 3.1 | 7.6 | 1.0 | Hexane | 72.4 | 10.1 |
| 101 | 3.2 | 8.2 | 1.0 | Heptane | 65.1 | 8.7 |
| 102 | 3.1 | 7.6 | 1.0 | Ethylene dichloride | 59.9 | 1.2 |

EXAMPLES 103–110

Ethylene oxide was polymerized under the same conditions as in Examples 92–102 except that 0.2 part by weight of a solid product obtained by reacting an organotin compound and a phosphorus compound indicated in the following Table 20 in toluene at the boiling point (110.6° C.) of toluene for 60 minutes was used as catalyst.

The results were as shown in Table 20. However, in Examples 104, 105, 108 and 110, 0.2 part by weight of the product obtained by heating a mixture of an organotin compound and a phosphorus compound at 260° C. for 30 minutes without using toluene was used as catalyst.

was added thereto, and then 100 parts by weight of ethylene oxide (a 20% solution in benzene) were added. The polymerization reaction was carried out at 30° C. for 20 hours. The yield and $\eta_{sp./c.}$ of the polyethylene oxide thus obtained were as shown in the following Table 23.

TABLE 20

| Ex. | Phosphorus compound Kind | Grams | Organotin compound Kind | Grams | Phosphorus compound/ organotin compound (molar ratio) | Polyethylene oxide Yield (percent) | $\eta sp./c$ |
|---|---|---|---|---|---|---|---|
| 103 | Orthophosphoric acid | 2.4 | Dibutyltin dilaurate | 32.4 | 0.48 | 42.8 | 7.8 |
| 104 | do | 2.5 | do | 32.7 | 0.49 | 9.5 | 3.2 |
| 105 | Phosphorus pentoxide | 3.3 | do | 30.9 | 0.43 | 13.9 | 10.4 |
| 106 | do | 3.0 | do | 28.0 | 0.48 | 2.2 | 0.8 |
| 107 | Orthophosphoric acid | 5.1 | Dibutyltin dichloride | 31.6 | 0.50 | 6.2 | 2.0 |
| 108 | do | 5.2 | do | 33.9 | 0.47 | 0.3 | (*) |
| 109 | do | 3.0 | Tetraethyltin | 14.5 | 0.50 | 7.3 | 3.1 |
| 110 | do | 4.6 | do | 22.1 | 0.44 | 0.8 | (*) |

*See footnote (*) bottom of Table 11.

EXAMPLES 111–115

Epichlorohydrin was polymerized by using the catalyst used in Examples 92, 93, 94, 95 or 96. 2 parts by weight of catalyst were used per 100 parts by weight of monomer, and the polymerization was carried out at 60° C. for 20 hours. After completion of the reaction, the hexane insoluble portion was separated and dried, and thus a white solid polymer was obtained. The yield and $\eta_{sp.}/^{c}$ of the polyepichlorohydrin thus obtained were as shown in the following Table 21.

TABLE 21

| Ex. | Catalyst, the same as in Ex.— | Polyepichlorohydrin Yield (percent) | $\eta sp./c.$ |
|---|---|---|---|
| 111 | 92 | 5.8 | 2.4 |
| 112 | 93 | 12.9 | 3.8 |
| 113 | 94 | 8.3 | 3.0 |
| 114 | 95 | 3.2 | 2.1 |
| 115 | 96 | 3.6 | 2.0 |

EXAMPLES 116–119

Ethylene oxide and epichlorohydrin were copolymerized by using the catalyst used in Examples 92, 93, 94 or 96. 100 parts by weight of a monomer mixture consisting of 90.5 parts by weight of epichlorohydrin and 9.5 parts by weight of ethylene oxide were polymerized at 60° C. for 20 hours by using 0.5 part by weight of the catalyst. After completion of the reaction, the n-hexane insoluble portion was separated and dried, and thus a white solid copolymer was obtained. The composition of the copolymer was determined by measuring its chlorine content. The yield, $\eta_{sp./c.}$ and composition of the copolymer thus obtained were as shown in the following Table 22.

TABLE 22

| Ex. | Catalyst, the same as in Ex.— | Copolymer Yield (percent) | $\eta_{sp.}/c.$ | Composition (ethylene oxide mol percent) |
|---|---|---|---|---|
| 116 | 92 | 6.2 | 2.9 | 56.7 |
| 117 | 93 | 17.8 | 3.8 | 52.2 |
| 118 | 94 | 8.7 | 3.2 | 57.5 |
| 119 | 96 | 3.6 | 2.7 | 59.1 |

EXAMPLES 120–129

0.1 part by weight of the catalyst used in Example 93 was placed in a glass ampoule, the air inside the ampoule was replaced by nitrogen, an amount of triisobutylaluminum (a 4.5% solution in benzene) or titanium tetrabutoxide (a 5.0% solution in benzene) or aluminum isopropoxide (a 2.0% solution in benzene)

TABLE 23

| Ex. | Organoaluminum compound or titanium alkoxide compound Kind | Parts by weight | Polyethylene oxide Yield (percent) | $\eta_{sp./c.}$ |
|---|---|---|---|---|
| 120 | | | 5.1 | 3.3 |
| 121 | Triisobutylaluminum | 0.5 | 28.3 | 12.4 |
| 122 | do | 1.0 | 21.4 | 11.6 |
| 123 | do | 5.0 | 26.1 | 11.3 |
| 124 | Aluminum isopropoxide | 0.5 | 11.5 | 6.9 |
| 125 | do | 1.0 | 19.7 | 9.0 |
| 126 | do | 5.0 | 21.2 | 8.7 |
| 127 | Titanium tetrabutoxide | 0.5 | 3.9 | 3.4 |
| 128 | do | 1.0 | 15.6 | 8.3 |
| 129 | do | 5.0 | 28.1 | 13.2 |

EXAMPLES 130–133

Epichlorohydrin (a 30% solution in benzene) was polymerized at 30° C. for 20 hours by using 5.0 parts by weight of the catalyst used in Example 93 and an amount of triisobutylaluminum. The yield and $\eta_{sp./c.}$ of the polyepichlorohydrin thus obtained were as shown in the following Table 24.

TABLE 24

| Ex. | Amount of triisobutylaluminum added (parts by weight) | Polyepichlorohydrin Yield (percent) | $\eta_{sp./c.}$ |
|---|---|---|---|
| 130 | 0.0 | 2.0 | 2.2 |
| 131 | 0.5 | 1.4 | 1.9 |
| 132 | 2.0 | 19.1 | 4.1 |
| 133 | 5.0 | 34.2 | 4.0 |

EXAMPLES 134–137

Propylene oxide (a 30% solution in benzene) was polymerized at 60° C. for 20 hours by using 2.0 parts by weight of the catalyst used in Example 93 and an amount of triisobutylaluminum. After completion of the reaction, benzene of an amount three times as much as the amount of the polymerization system was added to dissolve the reaction product homogeneously, and then it was freeze dried. Thus, a white solid polymer was obtained. The yield and $\eta_{sp./c.}$ of the polypropylene oxide thus obtained were as shown in the following Table 25.

TABLE 25

| Ex. | Amount of triisobutylaluminum added (parts by weight) | Polypropylene oxide Yield (percent) | $\eta_{sp./c.}$ |
|---|---|---|---|
| 134 | 0.0 | 19.7 | 10.4 |
| 135 | 0.5 | 54.4 | 13.7 |
| 136 | 1.0 | 82.6 | 15.2 |
| 137 | 2.0 | 94.0 | 16.5 |

We claim:
1. A process for the preparation of alkylene oxide polymers which comprises homopolymerizing a 1,2-alkylene oxide or copolymerizing 1,2-alkylene oxides in the presence of a catalyst comprising the reaction product of at least one organostannic compound having at least one Sn=C bond and at least one inorganic phosphorus compound selected from the group consisting of phosphoric acid compounds and phosphorus oxide compounds.

2. A process for the preparation of alkylene oxide polymers which comprises homopolymerizing a 1,2-alkylene oxide or copolymerizing 1,2-alkylene oxides in the presence of a catalyst comprising the reaction product of at least one organostannic compound having at least one Sn=C bond and at least one inorganic phosphorus compound selected from the group consisting of phosphoric acid compounds and phosphorus oxide compounds, and at least one organoaluminum compound selected from the group consisting of alkylaluminums, alkylaluminum halides and aluminum alkoxides.

3. A process for the preparation of alkylene oxide polymers which comprises homopolymerizing a 1,2-alkylene oxide or copolymerizing 1,2-alkylene oxides in the presence of a catalyst comprising the reaction product of at least one organostannic compound having at least one Sn=C bond and at least one inorganic phosphorus compound selected from the group consisting of phosphoric acid compounds and phosphorus oxide compounds, and at least one titanium tetraalkoxide compound.

4. A process for the preparation of alkylene oxide polymers which comprises homopolymerizing 1,2-alkylene oxide or copolymerizing 1,2-alkylene oxides in the presence of a catalyst comprising the reaction product of at least one organostannic compound having at least one Sn=C bond and at least one inorganic phosphorus compound selected from the group consisting of phosphoric acid compounds and phosphorus oxide compounds, and a mixture comprising at least one organoaluminum compound selected from the group consisting of alkylaluminums, alkylaluminum halides and aluminum alkoxides and at least one titanium tetraalkoxide compound.

References Cited
UNITED STATES PATENTS

| | | | |
|---|---|---|---|
| 3,281,376 | 10/1966 | Proops | 260—47 XR |
| 3,135,705 | 6/1964 | Vandenberg | 260—2 |
| 2,956,959 | 10/1960 | Detter | 260—2 |

WILLIAM H. SHORT, Primary Examiner

T. C. PERTILLA, Assistant Examiner

U.S. Cl. X.R.

252—431 P; 260—18 PF, 47 Ep, 88.3 A, 429.7, 613 B, 615 B